(12) United States Patent
    Caruel et al.

(10) Patent No.: US 11,286,880 B2
(45) Date of Patent: Mar. 29, 2022

(54) THRUST INVERTER WITH OPTIMIZED OPENING AND CLOSING SYSTEM

(71) Applicant: Safran Nacelles, Gonfreville l'Orcher (FR)

(72) Inventors: Pierre Caruel, Gonfreville l'Orcher (FR); Regis Giard, Gonfreville l'Orcher (FR); Denis Guillois, Gonfreville l'Orcher (FR); Philippe Vancon, Gonfreville l'Orcher (FR)

(73) Assignee: Safran Nacelles, Gonfreville l'Orcher (FR)

(*) Notice: Subject to any disclaimer, the term of this patent is extended or adjusted under 35 U.S.C. 154(b) by 316 days.

(21) Appl. No.: 16/394,128

(22) Filed: Apr. 25, 2019

(65) Prior Publication Data

US 2019/0353118 A1    Nov. 21, 2019

(30) Foreign Application Priority Data

Apr. 25, 2018 (FR) ...................................... 1853621

(51) Int. Cl.
   *F02K 1/62*   (2006.01)
   *F02K 1/76*   (2006.01)

(52) U.S. Cl.
   CPC .............. *F02K 1/625* (2013.01); *F02K 1/763* (2013.01); *F05D 2210/12* (2013.01); *F05D 2220/323* (2013.01)

(58) Field of Classification Search
   CPC ... F02K 1/60; F02K 1/605; F02K 1/62; F02K 1/625; F02K 1/70; F02K 1/72; F02K 1/763; F02K 1/76
   See application file for complete search history.

(56) References Cited

U.S. PATENT DOCUMENTS

| 3,741,559 | A  | * | 6/1973 | Ross ........................ | F16F 9/19 267/124 |
| 4,147,027 | A  | * | 4/1979 | Greathouse ............... | F02K 1/60 60/226.2 |
| 6,260,801 | B1 | * | 7/2001 | Peters ...................... | F02K 1/60 244/11 OB |
| 6,845,945 | B1 | * | 1/2005 | Smith ...................... | B64D 33/04 239/265.19 |
| 2010/0115916 | A1 | * | 5/2010 | D'Inca ..................... | F02K 1/58 60/226.2 |

* cited by examiner

*Primary Examiner* — Andrew H Nguyen
(74) *Attorney, Agent, or Firm* — Burris Law, PLLC

(57) ABSTRACT

A thrust reverser includes two thrust reverser elements movable between a retracted position in which the thrust reverser is inactive and a deployed position in which the thrust reverser is active, a cylinder for deploying the thrust reverser elements, and a single-acting cylinder for retracting the thrust reverser elements.

5 Claims, 1 Drawing Sheet

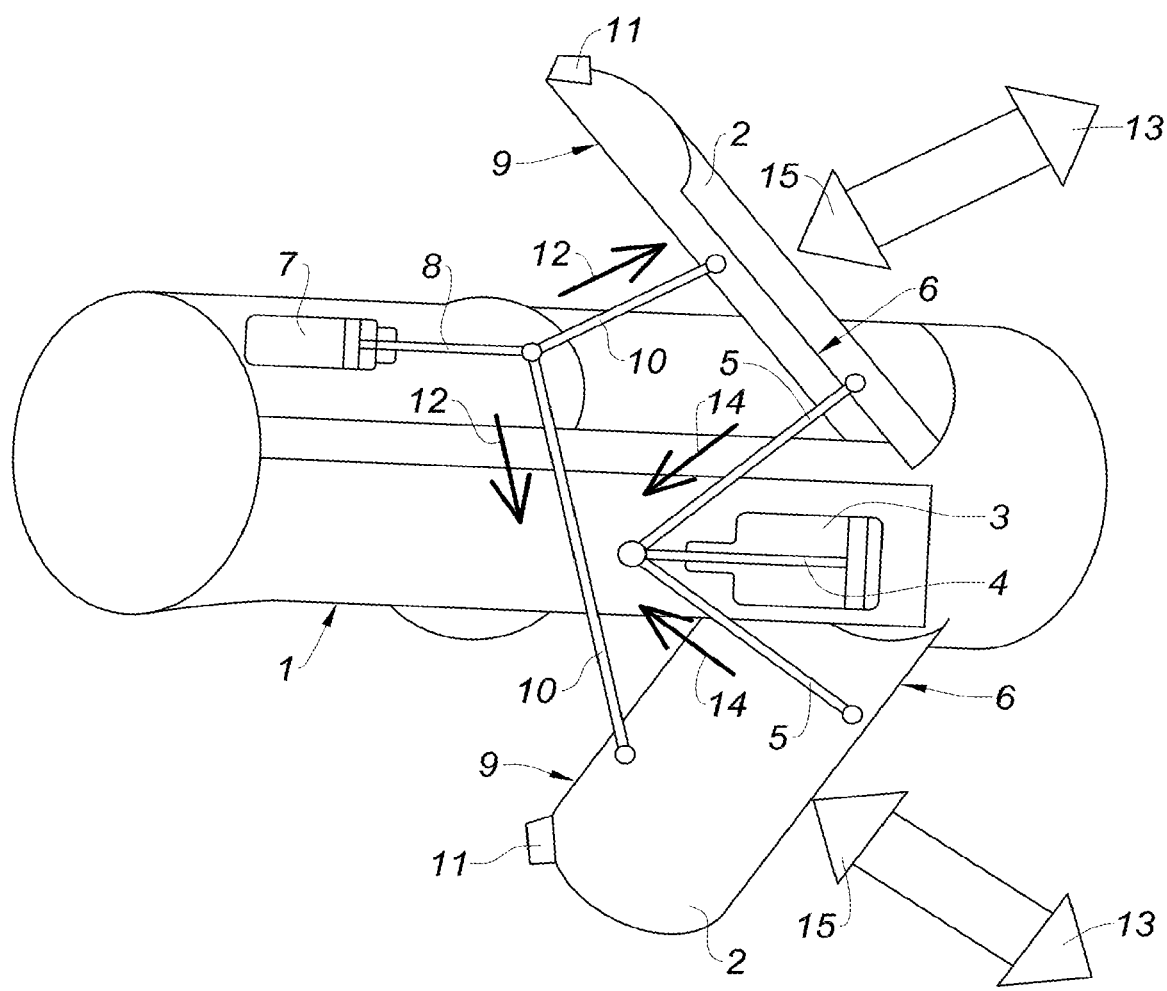

THRUST INVERTER WITH OPTIMIZED OPENING AND CLOSING SYSTEM

CROSS-REFERENCE TO RELATED APPLICATIONS

This application claims priority to and the benefit of FR 18/53621 filed on Apr. 25, 2018. The disclosures of the above applications are incorporated herein by reference.

FIELD

The present disclosure relates to a thrust reverser, and a nacelle for an aircraft propulsion unit equipped with this thrust reverser.

BACKGROUND

The statements in this section merely provide background information related to the present disclosure and may not constitute prior art.

In order to shorten the braking distance of an aircraft equipped with turbojet engines each surrounded by a nacelle ensuring guidance of a gas flow generated by the turbojet engine, it is known to equip the aircraft with a thrust reverser.

The thrust reverser comprises movable thrust reverser elements, generally two movable thrust reverser elements, carried by the nacelle to be displaced between a retracted position in which the thrust reverser is inactive, and a deployed position in which the thrust reverser is active, that is to say, the thrust reverser in the deployed position returns forward at least one portion of the gas flow generated by the turbojet engine.

In a thrust reverser type, the movable thrust reverser elements are doors.

In existing thrust reversers with doors, the position of the movable thrust reverser elements is controlled by double-acting cylinders. A double-acting cylinder comprises two chambers which can be communicated with a fluid, independently of each other, in order to exert a force in either direction. The sizes of the cylinders are determined by the force that it is necessary to apply to the movable elements upon the retraction during which the movable elements are displaced against the force applied by the gases generated by the turbojet engine, and against the aerodynamic force resulting from the displacement of the aircraft. The force required for the deployment is thus very different from the force required for the closure.

In the deployment direction, that is to say during the passage from the retracted position to the deployed position, the cylinders are therefore largely oversized.

SUMMARY

A thrust reverser whose diameters and swept volumes are improved for deployment and retraction is provided.

In one form of the present disclosure, a thrust reverser for a nacelle of an aircraft propulsion unit includes at least one thrust reverser element movable between a retracted position in which the thrust reverser is inactive, and a deployed position in which the thrust reverser is active. The at least one thrust reverser element is preferably a door. The thrust reverser includes at least one actuator for actuating said at least one thrust reverser element. According to the teachings of the present disclosure, the at least one actuator comprises at least one cylinder for deploying said at least one thrust reverser element, and at least one single-acting cylinder for retracting said at least one thrust reverser element.

The expression «single-acting cylinder» refers to a cylinder including one single chamber which can be communicated with a fluid in order to exert a force in one single direction, in contrast with a double-acting cylinder.

Thus, each cylinder can be accurately sized according to the force to which the associated movable element is subjected.

According to an advantageous version of the present disclosure, said at least one deployment cylinder may be a single-acting cylinder. Thus, the deployment cylinder and the retraction cylinder can be configured independently of each other.

In particular, said at least one deployment single-acting cylinder may have sizes smaller than said at least one retraction single-acting cylinder.

According to another advantageous aspect of the present disclosure, the thrust reverser may include two thrust reverser elements, one single cylinder for deploying the two thrust reverser elements, and one single cylinder for retracting the two thrust reverser elements.

According to yet other aspects of the present disclosure which may be considered alone or in combination: the deployment cylinder and the retraction cylinder may be diametrically opposed with respect to a main axis of the nacelle; the thrust reverser may include at least one active lock associated with the retraction single-acting cylinder; said at least one active lock may be associated with a retraction single-acting cylinder; said at least one active lock may be disposed on a side opposite to the single-acting cylinder with which it is associated.

In the present disclosure, the expression «active lock» refers to a lock capable of applying, at the end of the stroke, a closing force on the movable portion of the thrust reverser and capable of holding the movable portion of the thrust reverser in the closed position.

The present disclosure also concerns a nacelle for an aircraft propulsion unit including a thrust reverser according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a functional schematic representation a nacelle with a thrust reverser according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a nacelle 1 is equipped with a thrust reverser comprising, in a manner known per se, two thrust reverser elements, herein two doors 2 mounted so as to pivot on axes, not represented, extending perpendicular to the longitudinal axis of the nacelle. In a manner also known per se, the doors 2 are mounted diametrically opposite to each other.

According to one form of the present disclosure, the thrust reverser includes a retraction single-acting cylinder 3 fastened on a side of the nacelle and whose rod 4 extends parallel to the longitudinal axis of the nacelle. The rod 4 is connected to a side 6 of the doors 2 by tie rods 5.

The thrust reverser further includes a deployment single-acting cylinder 7 fastened on a side of the nacelle diametrically opposite to the fastening side 6 of the retraction cylinder 3, with respect to an axis along which the nacelle extends 1. The deployment cylinder 7 includes a rod 8 which extends parallel to the longitudinal axis of the nacelle. The rod 8 is connected to a side 9 of the doors 2 opposite to the side 6 by tie rods 10. For a better illustration of the connections, the cylinder 7 and the tie rods 10 have been represented in a visible manner in the FIGURE while physically they are disposed on a side of the nacelle opposite to the retraction cylinder 3.

The deployment cylinder 7 has sizes smaller than the sizes of the retraction cylinder 3 in the proportion of the forces to which the doors 2 are subjected during deployment or retraction.

In the illustrated form, each door 2 is equipped with an active lock 11 associated with the retraction cylinder 3. In a manner known per se, the term «active lock» refers to a lock which can open under load and adapted to be engaged, at the end of the retraction stroke, by compensating for the deformations of the door resulting from the aerodynamic loads during the retraction. In the illustrated form, the active locks 11 are mounted on the side 9 of the doors, opposite to the retraction cylinder 3.

During the operation of the thrust reverser, the deployment cylinder 7 is supplied with hydraulic liquid whereas the retraction cylinder 3 is connected to a return reservoir, not represented, which causes the extension of the rod 8 and therefore the transmission of a deployment force to the doors 2, as illustrated by the arrows 12 and 13 in the FIGURE. Simultaneously, the tie rods 5 cause the withdrawal of the rod 4 from the retraction cylinder 3.

When the thrust reverser is set to the inactive position, the retraction cylinder 3 is supplied with hydraulic fluid, whereas the deployment cylinder 7 is connected to a return circuit, not represented, which causes the extension of the rod 4 and therefore the transmission of a retraction force to the doors 2, as illustrated by the arrows 14 and 15 in the FIGURE. Simultaneously, the tie rods 10 cause the withdrawal of the rod 8 from the deployment cylinder 7.

At the end of the stroke, the active locks 11 provide a locking of the doors 2, which allows canceling or limiting any asymmetry of deformation of the doors induced by the asymmetrical configuration of the cylinder.

Of course, the present disclosure is not limited to the described forms and variants are possible yet without departing from the scope of the present disclosure as defined by the claims.

In particular, although the device according to the present disclosure has been illustrated in connection with a thrust reverser comprising two thrust reverser elements, one single cylinder for deploying the two thrust reverser elements, and one single cylinder for retracting the two thrust reverser elements, it is possible to provide for a different number of movable elements and maneuvering cylinders.

Although the present disclosure has been described in connection with a thrust reverser including only single-acting cylinders, it is possible to achieve the deployment function with a double-acting cylinder, the retraction function then being achieved by a combination of the double-acting cylinder considered in the direction of the retraction, and of a single-acting cylinder in a retraction direction.

Although the present disclosure has been illustrated in connection with a thrust reverser including movable elements in the form of pivoting doors, the present disclosure may be carried out with a thrust reverser including, in a manner known per se, cascades associated with a cowl which is movable in translation.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A thrust reverser for a nacelle of an aircraft propulsion unit comprising:
   two thrust reverser elements movable between a retracted position in which the thrust reverser is inactive and a deployed position in which the thrust reverser is active;
   only one single-acting cylinder for deploying said two thrust reverser elements; and
   only one single-acting cylinder for retracting said two thrust reverser elements,
   wherein said one single-acting cylinder for deploying said two thrust reverser elements is on a first side of the nacelle and said one single-acting cylinder for retracting said two thrust reverser elements is on a second side of the nacelle that is diametrically opposite the first side.

2. The thrust reverser according to claim 1, wherein said one single-acting cylinder for deploying said two thrust reverser elements has a size that is smaller than said one single-acting cylinder for retracting said two thrust reverser elements.

3. The thrust reverser according to claim 1 further comprising at least one active lock associated with said one single-acting cylinder for retracting said two thrust reverser elements.

4. The thrust reverser according to claim 3, wherein said at least one active lock is disposed on a side of said two thrust reverser elements opposite to said one single-acting cylinder for retracting said two thrust reverser elements.

5. A nacelle for an aircraft propulsion unit comprising:
   a thrust reverser with two thrust reverser elements movable between a retracted position in which the thrust reverser is inactive and a deployed position in which the thrust reverser is active, only one single-acting cylinder for deploying said two thrust reverser elements, and only one single-acting cylinder for retracting said two thrust reverser elements,
   wherein said one single-acting cylinder for deploying said two thrust reverser elements is on a first side of the nacelle and said one single-acting cylinder for retracting said two thrust reverser elements is on a second side of the nacelle that is diametrically opposite the first side.

\* \* \* \* \*